US006406757B1

(12) United States Patent
Blatter et al.

(10) Patent No.: US 6,406,757 B1
(45) Date of Patent: Jun. 18, 2002

(54) PROCESS FOR COATING A SURFACE WITH A POWDER COATING COMPOSITION

(75) Inventors: Karsten Blatter, Erftstadt; Frank Niggemann, Landshut; Frank Zimmermann, Frontenhausen, all of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/622,461

(22) PCT Filed: Feb. 12, 1999

(86) PCT No.: PCT/EP99/01009

§ 371 (c)(1),
(2), (4) Date: Aug. 16, 2000

(87) PCT Pub. No.: WO99/41323

PCT Pub. Date: Aug. 19, 1999

(30) Foreign Application Priority Data

Feb. 17, 1998 (DE) ........................................ 198 06 445

(51) Int. Cl.[7] ................................................ B05D 3/06
(52) U.S. Cl. ...................... 427/517; 427/518; 427/521; 427/195

(58) Field of Search ................................ 427/508, 517, 427/518, 521, 189, 195

(56) References Cited

FOREIGN PATENT DOCUMENTS

| GB | 2007537 A | * | 5/1979 |
|---|---|---|---|
| GB | 2056885 A | * | 3/1981 |
| JP | 59-016571 A | * | 1/1984 |
| JP | 05-092172 A | * | 5/1991 |

OTHER PUBLICATIONS

Bar et al., Fokussierte NIR—Technologie: Aushartung im Sekundentakt, annual conference, Die EPS–Praxis 1997, Bad Neuheim 27–28/11/97.

* cited by examiner

*Primary Examiner*—Erma Cameron
(74) *Attorney, Agent, or Firm*—Steven C. Benjamin

(57) ABSTRACT

Process for the production of powder finishes on metallic or non-metallic surfaces, characterized in that powder coating compositions are used which contain resins which may be crosslinked by means of functional groups capable of forming hydrogen bonds, wherein the functional groups are present at a concentration of greater than 100 mmol/kg of powder coating composition, the powder coating compositions are applied to the substrate and are melted and cured by NIR irradiation.

13 Claims, No Drawings

PROCESS FOR COATING A SURFACE WITH A POWDER COATING COMPOSITION

FIELD OF THE INVENTION

This invention relates to the production of powder finishes for metallic and non-metallic substrates such as wood and plastic substrates, glass and ceramics.

BACKGROUND OF THE INVENTION

Using powder coatings to provide decorative or functional finishes has found widespread acceptance in metals coating due to the elevated economic viability of the process and its favourable environmental characteristics. Numerous powder coating formulations have been developed for different applications. The processes hitherto available for curing powder coatings require that the powder deposited on the substrate first be melted by heating to temperatures above the glass transition temperature or melting point of the powder coating formulation. Heat sources which are used are, for example, convection ovens, infra-red light sources or combinations of the two. In the case of thermally crosslinking systems, the powder coating is typically cured by heating to temperatures of between 140 and 200° C. for a period of approx. 10 to 30 minutes.

In the case of UV-curing powder coating formulations, the molten powder coating is cured within a few seconds by means of ultraviolet radiation. The powder coatings are generally crosslinked by polymerising double bonds or cyclic ethers using a free-radical or cationic reaction mechanism.

Both processes have disadvantages. Elevated temperatures are necessary for thermally curing powder coatings which, on the one hand, do not allow temperature-sensitive surfaces such as wood or plastic to be coated and, on the other hand, require an elevated energy input for metal components. Using UV-curing powder coatings entails two process steps as the powder must first be melted by heating and curing with UV radiation then proceeds in a second step. Moreover, curing thick films of pigmented powder coatings is problematic as the UV radiation is absorbed by the colouring components, such that achieving a complete cure of the coating is more difficult.

Apart from the above-stated conventional curing processes, another method is known by means of which powder coatings may be cured with near infra-red (NIR) radiation by using high intensity radiation (after Bar, Sedelmey, *Fokussierte NIR-Technologie,* annual conference, *Die EPS-Praxis* 1997, Bad Neuheim 27–28.11.97). Using this method, it is possible to perform both melting and curing of powder coatings in a single process step, wherein elevated curing temperatures may be achieved without the coated substrate being substantially heated. However, the coatings obtained are not always satisfactory and reproducible with regard to properties such as coating quality and hardness.

GB-A 2 056 885 describes a process for coating cellulosic material such as wood and paper, in which a powder coating is applied and radiation cured. IR irradiation proceeds over a range from 1 to 5 $\mu$m in a period of 20 to 120 seconds and thus results with a relatively high energy input in obtaining the desired properties.

SUMMARY OF THE INVENTION

The object of the invention is accordingly to provide a process in which powder finishes are obtained by melting and curing powder coating compositions in a single process step with short curing times, wherein the finishes are distinguished by a uniform coating and improved mechanical properties as well as by improved solvent resistance.

This object is achieved by a process in which powder coating compositions are used which contain resins which may be crosslinked by means of functional groups capable of forming hydrogen bonds, wherein these functional groups are present at a concentration of greater than 100 mmol/kg of powder coating composition, the powder coating compositions are applied to the substrate and are melted and cured by NIR irradiation.

DETAILED DESCRIPTION OF THE INVENTION

Powder coating compositions which may, for example, be used are those based on polyester resins, epoxy resins, (meth)acrylic resins and optionally crosslinking resins. The resins may, for example, contain OH, COOH, RNH, $NH_2$ and/or SH as the functional groups capable of forming hydrogen bonds. Suitable crosslinking resins are, for example, di- and/or polyfunctional carboxylic acids, dicyandiamide, phenolic resins and/or amino resins. The functional groups may here be attached to the binder to be crosslinked and/or to the crosslinking resin (curing agent).

The quantity of the binder and curing agent functionalised according to the invention is selected such that the functional groups are present in the powder coating composition at a concentration of greater than 100 mmol/kg. The compositions may, for example, contain 15 to 95 wt. % of the resins functionalised according to the invention, such as for example polyesters, epoxy resins and/or (meth)acrylate resins and 0.1 to 50 wt. % of the curing agents functionalised according to the invention. The binder present in such cases may comprise 20 to 95 wt. % of a polyester containing carboxyl groups and/or 15 to 95 wt. % of a hydroxy-functionalised polyester. Curing agents according to the invention, which are, for example, used for curing epoxy binders in quantities of 1 to 30 wt. %, may be, for example, di- and/or polyfunctional carboxylic acids, dicyandiamide, phenolic resins and/or amino resins. The above stated values in "mmol/kg" and "wt. %" in each case relate to the complete powder coating composition (which optionally contains pigments and/or fillers and further additives).

The crosslinking reaction may be additionally accelerated by the presence in the powder coating composition according to the invention of catalysts known from thermal crosslinking. Such catalysts are, for example, tin salts, phosphides, amines and amides. They may be used, for example, in quantities of 0.02 to 3 wt. %. Such crosslinking catalysts are preferably used.

In accordance with the process according to the invention, the powder coating compositions, which may contain constituents conventional in powder coating technology, such as pigments and/or fillers as well as further lacquer additives, as further components, are applied to the substrate to be coated using conventional methods and then melted and cured by NIR radiation. Melting and curing generally amounts to less than 7 minutes, for example 1 second to 300 seconds, depending upon the particular composition of the powder coating.

The polyesters usable according to the invention may be produced in a conventional manner by reacting polycarboxylic acids, the anhydrides and/or esters thereof with polyalcohols, as is, for example, described in D. A. Bates, *The Science of Powder Coatings,* volumes 1 & 2, Gardiner House, London, 1990. Hydroxy- and/or carboxy-functionalised polyester resins are preferably used. The hydroxy and carboxy functions may be introduced by appropriate selection of the starting materials and/or the proportions thereof.

Mixtures of carboxyl and hydroxyl group containing polyesters may also be used. The carboxy-functionalised polyesters according to the invention conventionally have an acid value of 10 to 200 mg of KOH/g of resin and the hydroxy-functionalised polyesters have an OH value of 10 to 200 mg of KOH/g of resin.

Curing agents which may be used for the polyester resins are conventional curing agents such as, for example, cycloaliphatic, aliphatic or aromatic polyisocyanates, crosslinking agents containing epoxy groups, for example triglycidyl isocyanurate (TGIC), polyglycidyl ethers based on diethylene glycol, glycidyl-functionalised (meth)acrylic copolymers as well as crosslinking agents containing amino, amido or hydroxyl groups. Such carboxy-functionalised polyesters may, for example, be crosslinked using polyfunctional epoxides or polyfunctional hydroxyalkylamides. Hydroxy-functionalised polyesters crosslink, for example, with polyfunctional isocyanates which may, for example, be reversibly blocked by forming urethdione groups.

(Meth)acrylate resins bearing the functional groups according to the invention may furthermore be used. These may, for example, be produced from alkyl (meth)acrylates with hydroxyalkyl (meth)acrylates and olefinic monomers such as styrene and/or styrene derivatives. They may also comprise modified vinyl copolymers, for example based on monomers containing glycidyl groups and one or more ethylenically unsaturated monomers, for example alkyl (meth)acrylate, styrene, styrene derivatives, (meth) acrylamide or grafted vinyl copolymers which are grafted, for example, with ethylenically unsaturated acids, acid derivatives or the anhydrides thereof.

Hydroxy-functional (meth)acrylate resins are preferably used.

Curing agents conventionally used for (meth)acrylate resins are, for example, solid dicarboxylic acids, for example having 10 to 12 carbon atoms, as well as carboxy-functional polymers.

The term "(meth)acrylic" denotes "acrylic" and/or "methacrylic".

The functional groups according to the invention may also be introduced by means of the curing components used to crosslink the powder coatings. These may be curing agents containing hydroxy, carboxy, amide or amine groups, in particular of the class of compounds $R_2NH$, $RNH_2$ and CONHR, for example amino resins such as dicyandiamide and the derivatives thereof, as well as phenolic resins, for example based on phenol/formaldehyde, having an OH equivalent weight of 100 to 200 g/mol, which are used as curing agents for epoxy resins. Di- and/or polyfunctional carboxylic acids and the derivatives thereof may furthermore be used; for example those having a carboxy equivalent weight of 45 to 500 g/mol, which are used, for example, as curing agents for epoxy-functional acrylate resins. Examples of curing agents according to the invention for epoxy resins are curing agents containing carboxyl groups, those containing amide and/or amine groups, for example dicyandiamide and the derivatives thereof, carboxylic acids as well as phenolic resins. The curing agents used according to the invention may, for example, be present in the powder coating composition in a quantity of 0.1 to 50 wt. %, preferably of 0.1 to 30 wt. %. For example, 0.5 to 50 wt. % of dicyandiamide, 1 to 20 wt. % of phenolic resin and/or 1 to 20 wt. % of di- and/or polyfunctional carboxylic acids may be present.

It is, in general, also possible to introduce thiol groups according to the invention into the powder coating compositions.

Epoxy/polyester hybrid systems having the functional groups according to the invention are also usable, for example systems having an epoxy/polyester ratio of 50:50 or 30:70.

In such systems, the functional groups according to the invention are generally present in the polyester component. For example, such a polyester component contains carboxyl functions.

If the functional groups according to the invention are introduced into the composition by means of the curing components used to crosslink the powder coatings, the binders to be crosslinked may contain none of the functional groups according to the invention and be, for example, unsaturated polyester resins, epoxy resins and/or (meth) acrylate resins, for example epoxy-functionalised acrylate resins. The binders to be crosslinked may, however, also additionally bear the functional groups according to the invention, for example hydroxyl or carboxyl functions.

The powder coating compositions according to the invention may contain as further components the constituents conventional in powder coating technology, such as degassing auxiliaries, flow-control agents, flatting agents, texturing agents, light stabilisers etc. The powder coating composition preferably contains the crosslinking catalysts described above in the stated quantity range. The process is suitable both for curing clear powder coatings and coloured powder coatings coloured by means of pigments and fillers. Suitable pigments and fillers are known to the person skilled in the art. The quantities are within the conventional range familiar to the person skilled in the art. For example, the compositions may contain 0 to 50 wt. % of pigments and/or fillers. The quantity of additives is for example 0.01 to 10 wt. %.

A composition according to the invention may, for example, contain 40 to 70 wt. % of resin, such as polyester resin or epoxy resin, 2 to 30 wt. % of crosslinking agent, 0 to 50 wt. % of pigments and/or fillers, 0.02 to 3 wt. % of crosslinking catalysts and optionally further auxiliary substances and additives.

With regard to the use of hybrid powder coatings, a composition according to the invention may, for example, contain 25 to 70 wt. % of polyester resin, 25 to 50 wt. % of epoxy resin, 0 to 50 wt. % of pigments and/or fillers optionally together with further auxiliary substances and additives.

The powder coatings:.according to the invention may be produced using the known extrusion/grinding process. However, other processes, such as for example the production of powders by spraying from supercritical solutions or the "non-aqueous dispersion" process, may also be used.

The powder may be applied to the substrate to be coated using known electrostatic spraying processes, for example, using corona or tribo spray guns or using other suitable powder application methods. It is also possible to apply the powder in the form of an aqueous dispersion or "powder slurry". The NIR radiation may then advantageously be used to remove the water.

The powder coating is cured according to the invention by irradiating the applied powder coating composition with light, the maximum of the intensity characteristic curve of which is in the near infra-red range, lies generally within a range of frequencies from 750 to 1200 nm (NIR), wherein the powder initially melts and then cures in a very short time. This operation may generally proceed within a period of 2 to 400 seconds. NIR sources which may be used are, for example, halogen lamps, in particular high power halogen lamps which may, for example, achieve light source temperatures of 3500 K.

It is advantageous according to the invention to perform the melting and curing of the powder coating composition according to the invention in a period of 1 to 300 seconds, preferably of 1 to 30 seconds, using high-energy NIR radiation at a power of greater than 1 Watt/cm$^2$, relative to the irradiated area, preferably of more than 10 Watt/cm$^2$.

The process according to the invention may be performed discontinuously and continuously. In the case of continuous operation, the coated substrates may, for example, be passed before one or more stationary NIR radiation sources. The NIR radiation source may, however, also be mobile.

NIR irradiation may be used in combination with conventional heat sources such as infra-red radiation or convection ovens, optionally together with additional reflector systems and/or lens systems in order to intensify the radiation.

The process according to the invention is particularly suitable for coating temperature-sensitive substrates, for coating large, solid components or for coating tasks for which rapid curing is required. Examples of temperature-sensitive substrates are natural wood or derived timber product surfaces, plastic surfaces or metal components which contain further heat-sensitive components, such as for example liquids or lubricants. Conventional metal substrates, as well as glass and ceramics, may furthermore be coated.

In particular, functional coatings may also be applied onto tubes, metal components for reinforcing concrete or structural components, and coatings may be applied onto large components which cannot be heated in an oven, for example steel structures, bridges, ships.

The process according to the invention may also be used for high speed coating with powder coating on, for example, metal, wood, paper and film, for example for the coil coating process at coating speeds of, for example, >50 m/min.

The process according to the invention allows powder coatings to be melted and cured in a single process step with short curing times and, with the powder coating composition according to the invention, allows more uniform coating of the substrates during the melting and curing process. Use of the powder coating composition according to the invention furthermore improves the mechanical properties and flow of the coatings. Owing to the simplicity of handling the NIR radiation source, the short curing times and the selective heating of the powder layer and the improved quality of the coating, the process according to the invention allows powder coatings to be used in sectors such as steel construction (bridges, high-rise buildings, ship-building, industrial plant etc.) where it was hitherto impossible to use powder coating methods due to the large size of the objects to be coated.

The following Examples illustrate the invention.

EXAMPLE 1

An exterior grade, grey/white coloured powder coating containing 60 wt. % of a polyester having an acid value of 30 mg of KOH/g of resin (320 mmol of COOH/kg of powder coating), 5.5 wt. % of epoxy curing agent PT910 (Ciba Spezialitätenchemie), 4.0 wt. % of additives and 30.5 wt. % of pigments and fillers is sprayed onto a metal test sheet using a tribo spray gun. The metal sheet is then irradiated for 8 seconds with an NIR radiation source from Industrie SerVis at a power of approx. 40 Watt/cm$^2$. A completely cured, uniform powder coating of a film thickness of 60 $\mu$m is obtained which exhibits good flow, excellent mechanical properties and good solvent resistance.

EXAMPLE 2

A blue coloured epoxy/polyester (50:50) hybrid powder coating containing 28 wt. % of a polyester having an acid value of 50 mg of KOH/g of resin (249 mmol of COOH/kg of powder coating), 28 wt. % of epoxy, 4 wt. % of additives and 30.5 wt. % of pigments and fillers is sprayed onto a metal test sheet using a tribo spray gun. The metal sheet is then irradiated for 10 seconds with an NIR radiation sourcel from Industrie SerVis at a power of approx. 40 Watt/cm$^2$. A completely cured, uniform powder coating of a film thickness of 75 $\mu$m is obtained which exhibits good flow, excellent mechanical properties and good solvent resistance.

EXAMPLE 3

A white coloured powder coating containing 52 wt. % of an epoxy resin, a mixture prepared from 7.9 wt. % of a phenolic resin (299 mmol of OH/kg of powder coating) and 1 wt. % of dicyandiamide (357 mmol of NH/kg of powder coating), 3.2 wt. % of levelling agent and 35.9 wt. % of pigments and fillers is sprayed onto a metal test sheet using a tribo spray gun.

The metal sheet is then irradiated for 15 seconds with an NIR radiation source from Industrie SerVis at a power of approx. 40 Watt/cm$^2$. A completely cured, uniform powder coating of a film thickness of 60 $\mu$m is obtained which exhibits good flow, excellent mechanical properties and good solvent resistance.

EXAMPLE 4

An exterior grade, white coloured powder coating containing 58 wt. % of a polyester having an OH value of 25 mg of KOH/g of resin (258 mmol of OH/kg of powder coating), 8.0 wt. % of uretidione curing agent, 4 wt. % of additives and 30 wt. % of pigments and fillers is sprayed onto a metal test sheet using a tribo spray gun. The metal sheet is then irradiated for 10 seconds with an NIR radiation source from Industrie SerVis at a power of approx. 40 Watt/cm$^2$. A completely cured, uniform powder coating of a film thickness of 83 $\mu$m is obtained which exhibits good flow,, excellent mechanical properties and good solvent resistance.

EXAMPLE 5

An exterior grade, white/grey coloured powder coating containing 61 wt. % of a polyester having an acid value of 33 mg of KOH/g of resin (358 mmol of COOH/kg of powder coating), 4.5 wt. % of epoxy curing agent TGIC (PT 810 Ciba Spezialitatätenchemie), 4.0 wt. % of additives and 30.5 wt. % of pigments and fillers is sprayed onto a metal test sheet using a tribo spray gun. The metal sheet is then irradiated for 8 seconds with an NIR radiation source from Industrie SerVis at a power of approx. 40 Watt/cm$^2$. A completely cured, uniform powder coating of a film thickness of 60 $\mu$m is obtained which exhibits good flow, excellent mechanical properties and good solvent resistance.

Comparative Example 1

A UV curable clear powder coating, which contains an unsaturated polyester, urethane acrylate as co-binder and a UV initiator, as described, for example, in EP 0 585 742, is sprayed onto a metal test sheet using a tribo spray gun. After 60 seconds' irradiation with the NIR source as in Example 1, a non-uniform coating is obtained which has only partially flowed and exhibits no good mechanical properties and no solvent resistance.

Comparative Example 2

A clear powder coating which contains an epoxy-functional acrylate resin and a polyfunctional aliphatic carboxylic anhydride as curing component is sprayed onto a metal test sheet using a tribo spray gun. After 60 seconds' irradiation with the NIR source as in Example 1, a non-uniform coating is obtained which exhibits no good mechanical properties and no solvent resistance. Even with longer irradiation times, a satisfactory coating is not obtained.

What is claimed is:

1. A process for coating a surface of a substrate with a powder coating composition which comprises:

applying the powder coating composition to the surface of the substrate and melting and curing the powder coating composition for 1 to 300 seconds and at a radiation power of more than 1 W/cm$^2$ using near infra red radiation having a wave length of 750–1200 nm to form a finish on the substrate; and wherein the powder coating composition comprises resins that cross-link by means of functional groups selected from the group consisting of OH, COOH, $NH_2$, NHR, SH and any mixtures thereof that form hydrogen bonds, said groups being present at a concentration of greater than 100 mmol/kg of powder coating composition.

2. The process of claim 1, in which said resins are selected from the group consisting of polyester resins and (meth) acrylate resins.

3. The process of claim 1 in which the powder coating composition contains crosslinking resins having functional groups selected from the group consisting of OH, COOH, $NH_2$, NHR, SH and any mixtures thereof and are reactive with the functional groups of the resins.

4. The process of claim 1 in which the powder coating composition/contains 0.02 to 3 weight percent of a crosslinking catalyst.

5. The process of claim 1 in which the powder coating composition contains 20 to 95 weight percent of a polyester resin containing carboxy groups and having an acid value of 10 to 200 mg of KOH/g of resin.

6. The process of claim 1 in which the powder coating composition contains 15 to 95 weight percent of a polyester resin containing OH groups and having an OH value of 10 to 200 mg of KOH/g of resin.

7. The process of claim 3 in which the powder coating composition contains 0.5 to 5 weight percent of dicyandiamide.

8. The process of claim 1 in which the powder coating composition contains 1 to 20 weight percent of a phenolic resin having an OH group equivalent weight of 100 to 200 g/mol.

9. The process of claim 1 in which the powder coating composition contains 1 to 20 weight percent of a polyfunctional carboxylic acid having an equivalent weight of 45 to 500 g/mol of carboxyl groups.

10. The process of claim 1 wherein the process is a coil coating process operating at a strip speed of more than 50 m/min.

11. A coated substrate coated, with a powder coating composition according to the process of claim 1.

12. The coated substrate of claim 11 in which the substrate is selected from the group consisting of wood, wood products, plastics, glass, ceramics and metals.

13. The coated substrate of claim 12 in which the substrate contains heat sensitive components.

* * * * *